March 11, 1952 — R. C. GRAVIS — 2,589,075
TOOLHOLDER FOR IMPACT TOOLS
Filed Feb. 21, 1950
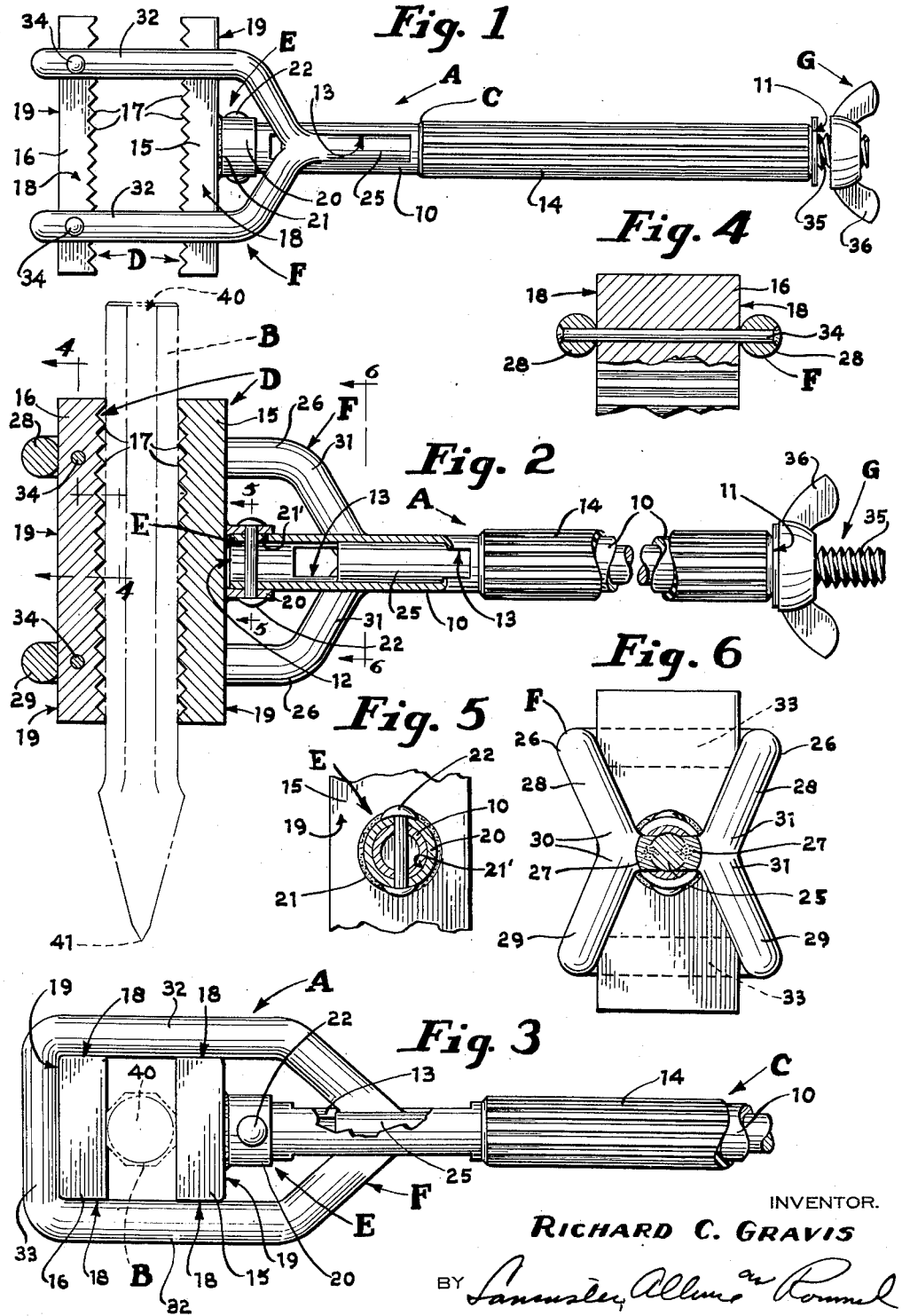
INVENTOR.
RICHARD C. GRAVIS
BY
ATTORNEYS.

Patented Mar. 11, 1952

2,589,075

UNITED STATES PATENT OFFICE 2,589,075

TOOLHOLDER FOR IMPACT TOOLS

Richard C. Gravis, Austin, Tex.

Application February 21, 1950, Serial No. 145,490

4 Claims. (Cl. 81—1)

This invention relates to tool holders and more specifically to holders for detachably supporting a tool, such as an impact tool, with the handle portion of the holder being adapted to be held by the operator during impacts. An example of such a tool is a gad employed in mining and quarrying.

An important object of the invention is to provide a holder which will securely hold an elongated impact tool, for example, in a desired location along the length of the tool with the hand of the operator, grasping the handle portion, remote from the tool, so that the hand will not be apt to be injured by the impact means, as a sledge, hammer or the like, and the operator need not grasp the tool, since grasping sometimes causes burrs to cut the operator's hand.

Another important object is to provide a tool holder which includes a pair of jaw portions with one movable with respect to the other and the movable jaw rigidly retained by movable means in such a manner that the movable jaw is held in positive engagement with a considerable area of the tool while the other or fixed jaw is held in engagement with a like area of the tool.

A further important object is to provide means which will not allow canting of the tool while the jaws grip it and, if the jaws accidently lose their grip upon the tool, as by being accidently separated, the tool will cant, at most, only slightly.

Furthermore, an important object is to provide a tool holder which contains no springs nor other parts apt to break or get out of order.

Other objects and advantages of the invention will be apparent during the course of the following detailed description of the invention taken in connection with the accompanying drawing forming a part of this disclosure and in which drawing:

Fig. 1 is an elevation of the new holder.

Fig. 2 is a view, somewhat enlarged over that of Fig. 1 and being partly in section showing the tool holder in a position of use.

Fig. 3 is a top plan view of the tool-holding end portion of the new holder, a part being broken away in order to reveal portions of the structure beneath.

Figs. 4, 5 and 6 are transverse sections substantially on their respective lines of Fig. 2.

In the drawing, wherein for the purpose of illustration is shown a preferred embodiment of the invention and wherein similar reference characters designate corresponding parts throughout the several views, the letter A designates the new tool holder and the letter B, a tool or instrument detachably held thereby.

The new tool holder A comprises a handle or grip portion C, tool-gripping means D, means E fixedly connecting a first portion of the means D with the handle portion C, means F for movably connecting another portion of the means D with the handle portion C, and means G releasably retaining the means F in various adjusted positions with respect to the first portion.

The handle or grip portion C includes a preferably elongated tubular member 10, having inner and outer end faces 11 and 12 respectively, and a pair of elongated, longitudinally-extending slots 13 adjacent the end 12 but may be spaced therefrom and they are disposed substantially 180° apart. The member 10 may be of iron or steel. This portion C also preferably includes a grip member 14, as an exteriorly corrugated rubber sheath, in good contact with the exterior surface of the member 10 from preferably the inner end 11 to adjacent the inner ends of the slots 13.

Preferably, the tool-gripping means D (best shown in Fig. 2) comprises two spaced-apart parallel, preferably narrow portions 15 and 16, providing jaws. Each may be an elongated but narrow bar of steel, provided with friction means such as the teeth 17 extending from their inner, opposite side faces. Each portion 15 and 16 has longitudinally-extending end faces 18 and an outer side face 19.

Means E for fixedly connecting the first portion 15 with the handle portion C and shown mainly in Figures 2 and 5, may comprise a socketed member 20, such as a collar of steel or iron firmly secured, as by the weld 21 (Figure 5) to the portion 15 to project outwardly from the side face 19. The socket 21' of the member 20 accommodates the end part of the member 10 adjacent the end face 12. A conventional rivet 22 may connect the members 10 and 20, as in Fig. 2.

Means F for movably connecting the other portion 16 with the handle portion C is believed of novel and particularly efficient construction and is shown particularly in Figures 2, 3, 4, and 6. It comprises an elongated shank portion 25, preferably cylindrical, and slidable in the tubular member 10, and two substantially like yoke members 26 including two short slot-accommodated radially-projecting extensions 27 from the shank portion 25, shown in Fig. 6, and a pair of double-ended arms 28 and 29 with one end part 30 of each arm merging into one extension 27 and the other like end part 31 of each arm merging into the other extension 27. Each end part 30 diverges from its associated end part 30, and, of course, extends outwardly from its associated extension 27, while each end part 31 diverges and extends likewise. At the outer end of each end part 30 and 31 is an arm part 32 preferably forming an obtuse angle therewith and substantially paralleling the longitudinal axis of the shank portion 26. At the outer end of each arm part 32 is a forward or bight part 33, connecting each of two arm parts 32 and forming substantially right angles with these connected parts 32. Of course the associated parts 32 and 33 merge into one another and into their associated end part 30 or 31 as the case may be. The arm parts 32 are all in substantially parallelism and are spaced apart so that the inner faces of the arm parts 32 of the arm 28 and the inner faces of the arm parts 32 of the arm 29 preferably abut or engage the end faces 18 of the jaw portions 15 and 16 although in such a manner that the parts 32 may slide over these end faces 18 of the portion 15. In order to firmly secure the arms 28 and 29 to the parallel jaw portion 16, the rivets 34 may be employed, as in Fig. 4. As may be seen in Figs. 1 and 2 the connections of the arms 28 and 29 with the jaw portion 16 are relatively close to the opposite extremities of the portion 16. The extensions 27 slide along the slots 13 as the means F is reciprocated since they are adapted to extend into, through and outwardly of the slots. The bight parts 33 have their inner faces in good contact with the side face 19 of the jaw portion 16. This construction forms a very substantial, rigid connection of the means F with the jaw portion 16.

The means G for retaining the means F in various adjusted positions so that the jaw portion 16 may be releasably retained in various adjusted positions toward or away from the jaw portion 15, may comprise an exteriorly screw threaded stub 35, integral with the shank portion 25 at an end thereof, and extending outwardly from the inner end face 11 and accommodating a suitable nut 36, as a wing nut, bearing against the end face 11 and preventing movement of the portion 16 and means F in one direction.

The tool or instrument B may be any of the various elongated tools and instruments (hereinafter designated broadly as tools) which include opposite ends and a pair of opposite, longitudinally-extending faces, with these faces adapted to be gripped by the friction means or teeth 14. With the jaw portions 15 and 16 spread, as in Fig. 1, the tool B is, of course, introduced into the space between the jaw portions 15 and 16 and the wing nut 36 tightened to draw the jaw portion 16 toward the portion 15 in good gripping relationship with the tool B as in Figs. 2 and 3.

The operator grasps the handle or grip portion C at the grip member 14 and may then employ the tool B, if an impact tool, by striking its exposed end face 40 while its opposite end 41 is in contact with the work (not shown). This positions the operator's hand remote from the tool B, for safety purposes.

Because of the spaced-apart yokes 26 engaging both the end faces 18 and outer side face 19 of the jaw portion 16, particularly adjacent the extremities of the jaw portion 16, and the yokes partly supported by, as well as partly supporting, the jaw portion 15 (where they contact the latter), a very firm and strong grip of the tool B by the holder A is provided. Even if the means G were to become accidently loosened, the tool B could not cant materially, because of the dual arms 28 and 29, as may be appreciated from Figure 1 taken with Fig. 3.

Various changes may be made to the form of the invention herein shown and described without departing from the spirit of the invention or scope of the claims.

What is claimed is:

1. In a tool holder, an elongated handle portion; a first elongated jaw portion having a pair of longitudinally-extending end faces; means securing the jaw portion to the handle portion, a second elongated jaw portion having a pair of longitudinally-extending end faces and an outer side face; means movably supporting the second jaw portion upon the handle portion to move selectively toward and away from said first jaw portion, including a pair of widely spaced-apart yokes, each yoke having substantially parallel arms in face contact with portions of said end faces of said second jaw portion and a bight in face contact with a portion of said side face, said arms slidable over portions of said first-named end faces; means securing said yokes to said second jaw portion; and means for causing relative movement between the two jaw portions and retaining them in selected fixed positions spaced one from the other.

2. In a tool holder, an elongated handle portion; a first elongated jaw portion having a pair of longitudinally-extending end faces; means fixedly securing the jaw portion to the handle portion to extend outwardly of the longitudinal plane of said handle portion and to form substantially a right angle with the longitudinal axis of said handle portion; a second elongated jaw portion having a pair of longitudinally-extending end faces and an outer side face; means movably supporting the second jaw portion upon the handle portion to move selectively toward and away from said first jaw portion in a path along said longitudinal axis, including a pair of widely spaced-apart yokes, each yoke having substantially parallel arms in face contact with portions of said end faces of said second jaw portion and a bight in face contact with a portion of said side face, said arms slidable over portions of said first-named end faces; means securing said yokes to said second jaw portion; and means for causing relative movement between the two jaw portions and retaining them in selected fixed positions spaced one from the other.

3. In a tool holder, an elongated handle portion, a pair of elongated jaw portions, each having a tool-engaging side face provided with teeth, a pair of longitudinally-extending end faces, a pair of transversely-extending end faces and a second side face substantially paralleling the tool-engaging side face; means securing the first jaw portion, intermediate its end faces, to said handle portion with the longitudinal axis of said first jaw portion and said handle portion forming a pair of right angles; movable means slidably supporting the second jaw portion upon said handle portion, to move selectively toward and away from said first jaw portion in a substantially straight path, including a pair of widely spaced-apart yokes, each yoke having substantially parallel arms in face contact with said longitudinally-extending end faces of said second jaw portion and a bight in face contact with a portion of said second side face of said second jaw portion, said arms slidable over portions of the said longitudinally-extending end faces of said first jaw portion; means securing said yokes to said second jaw portion adjacent said transversely-extending end faces of said second jaw portion; and means releasably retaining said second jaw portion in various adjusted positions towards and away from said first jaw portion.

4. In a tool holder, an elongated hollow handle portion provided with a pair of longitudinally-extending slots; a pair of elongated jaw portions, each having a tool-engaging side face provided with teeth, a pair of longitudinally-extending end faces, a pair of transversely-extending end faces and a second side face substantially paralleling the tool-engaging side face; means securing the first jaw portion, intermediate its end faces, to said handle portion with the longitudinal axis of said first jaw portion and said handle portion forming a pair of right angles; movable means slidably supporting the second jaw portion upon said handle portion, to move selectively toward and away from said first jaw portion in a substantially straight path, including a shank portion slidably carried within said handle portion, a pair of widely spaced-apart yokes, each yoke having substantially parallel arms in face contact with said longitudinally-extending end faces of said second jaw portion and a bight in face contact with a portion of said second side face of said second jaw portion, said arms slidable over portions of the said longitudinally-extending end faces of said first jaw portion, and said movable means also including a pair of extensions rigidly connecting said yokes to said shank portion, said extensions being positioned to extend radially therefrom and through said slots and fixedly secured to the arms of said yokes; means securing said yokes to said second jaw portion adjacent said transversely-extending end faces of said second jaw portion; and means releasably retaining said second jaw portion in various adjusted positions towards and away from said first jaw portion.

RICHARD C. GRAVIS.

REFERENCES CITED

The following references are of record in the file of this patent:

UNITED STATES PATENTS

| Number | Name | Date |
|---|---|---|
| 1,196,252 | LeGrand | Aug. 29, 1916 |
| 1,336,631 | Kissinger | Apr. 13, 1920 |
| 2,506,373 | McClain | May 2, 1950 |